Figure 1:
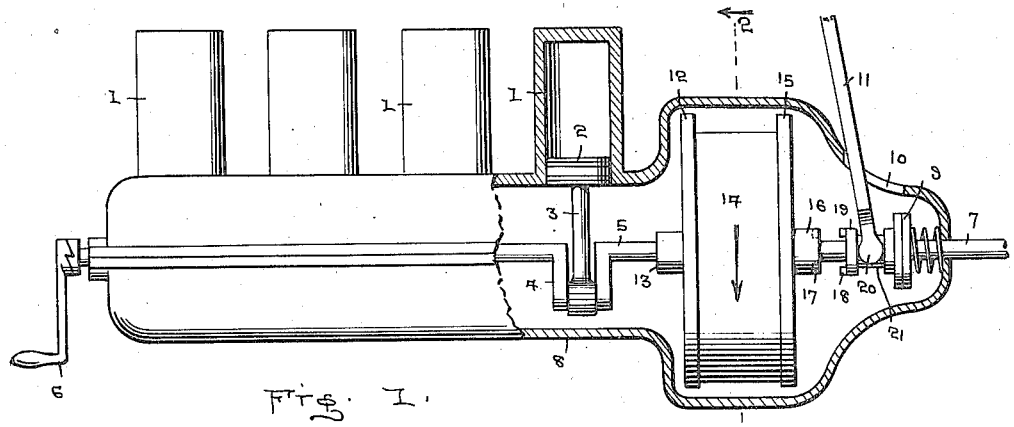

A. H. SWEET.
HYDRAULIC CLUTCH.
APPLICATION FILED NOV. 30, 1914.

1,194,572.
Patented Aug. 15, 1916.
3 SHEETS—SHEET 1.

Witnesses

Inventor
A. H. Sweet
By W. J. Fitzgerald & Co.
Attorney

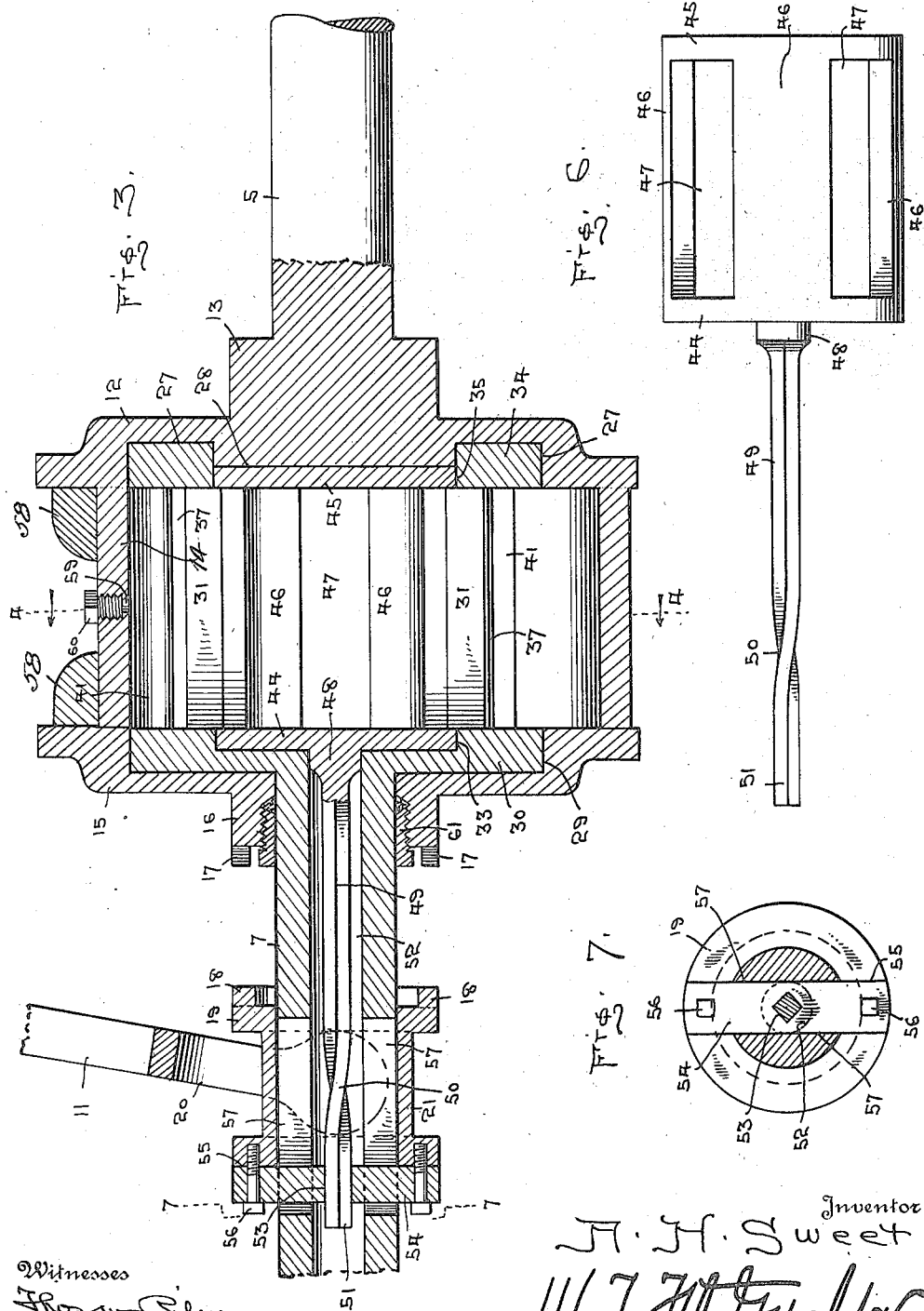

A. H. SWEET.
HYDRAULIC CLUTCH.
APPLICATION FILED NOV. 30, 1914.
1,194,572.
Patented Aug. 15, 1916.
3 SHEETS—SHEET 3.
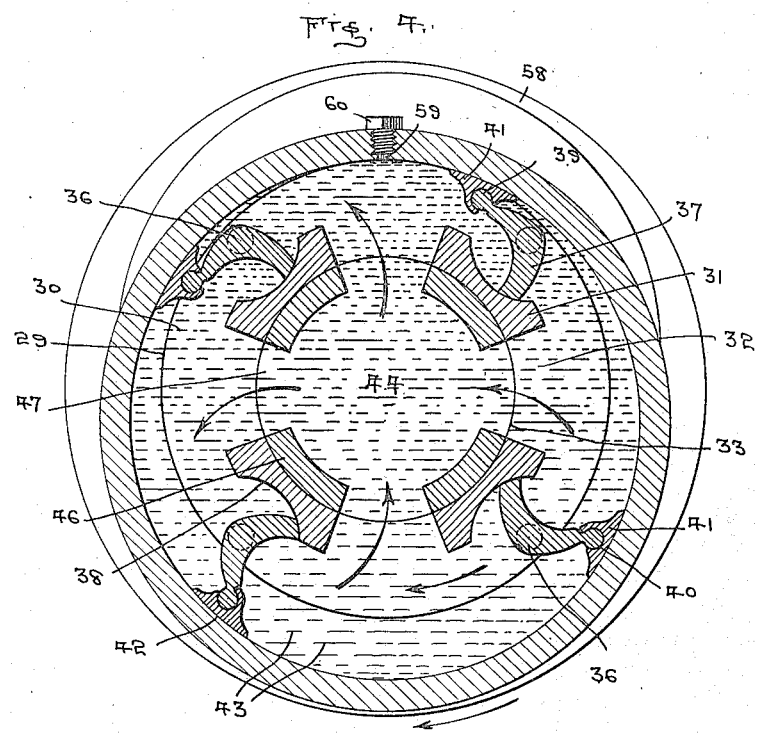
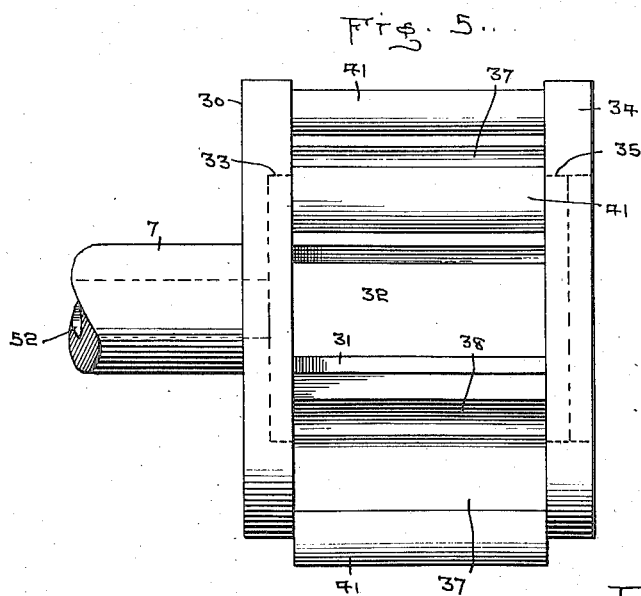

UNITED STATES PATENT OFFICE.

ALLEN HERBERT SWEET, OF CLARKS, LOUISIANA, ASSIGNOR OF ONE-FIFTH TO A. P. MACKLEY, OF DES LOGE, MISSOURI, AND ONE-FIFTH TO J. P. COLLINS AND ONE-FIFTH TO T. L. SORRELL, BOTH OF CALDWELL, LOUISIANA.

HYDRAULIC CLUTCH.

1,194,572.     Specification of Letters Patent.     Patented Aug. 15, 1916.

Application filed November 30, 1914. Serial No. 874,787.

*To all whom it may concern:*

Be it known that I, ALLEN HERBERT SWEET, a citizen of the United States, residing at Clarks, in the parish of Caldwell and State of Louisiana, have invented certain new and useful Improvements in Hydraulic Clutches; and I do hereby declare the following to be a full, clear, and exact description of the invention, such as will enable others skilled in the art to which it appertains to make and use the same.

This invention relates to clutches and more particularly to that type of clutches known as the hydraulic or fluid clutch, and has for one of its objects the provision of a clutch capable of use in connection with combustion engines, power shafting, and all kinds of machinery wherein a clutch may be used as a connecting medium between the operating parts.

Another object of this invention resides in the provision of a fluid clutch provided with means for establishing a gradual connection between its members until the members rotate substantially in unison, and subsequently locking rigidly the parts together.

A still further object of this invention resides in the provision of a fluid clutch provided with means for automatically supplying fluid thereto from the engine casing or other fluid container.

A still further object of this invention resides in the provision of a fluid clutch having one of its members eccentrically disposed relative to the other, the eccentrically disposed member being provided with a counterweight having an oil conduit therethrough, for balancing the eccentrically disposed member and for automatically supplying fluid to the clutch.

A still further object of this invention resides in the provision of a fluid clutch whereby either of its members may be mounted on either the driving shaft or the driven shaft with equal degree of efficiency when used in connection with a two-part shaft.

A still further object of this invention resides in the provision of a fluid clutch, simple in construction, efficient and durable in operation, and which can be manufactured at a nominal cost.

Another object of my invention is to provide, in a rotary power-translating device wherein the tapering chamber between relatively-rotatable, relatively eccentric members is subdivided into compartments by wings or blades, a novel and efficient pressure-balanced blade structure advantageously coördinated with the coacting parts.

Figure 2:
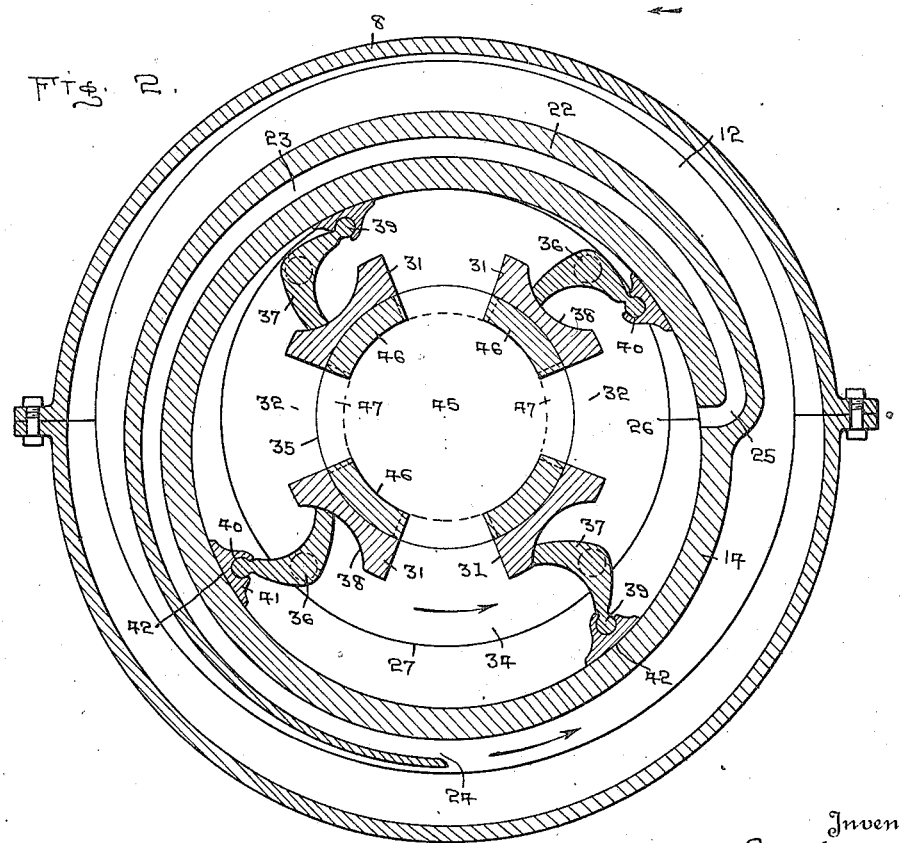

Other objects and advantages of this invention will be hereinafter more clearly set forth in the specification, defined in the claims, and illustrated in the accompanying drawings, in which, Figure 1 is a side elevation of a combustion engine and its casing, partly in section, showing the invention as applied to the fly wheel of the engine structure, Fig. 2 is a vertical, transverse, sectional view on line 2—2 of Fig. 1, looking in the direction of the arrows, showing the detail interior construction thereof, Fig. 3 is a vertical, longitudinal, sectional view of the invention, showing the same as applied to a two-part engine shaft or other power driven shaft, Fig. 4 is a vertical, transverse, sectional view on line 4—4 of Fig. 3, looking in the direction of the arrows, showing the detail construction, and the relative positions of the members thereof when the clutch is disposed in operative position relative to the two-part engine or other shaft, Fig. 5 is a side elevation of the inner member of the clutch, showing the same as secured upon the end of a shaft, the shaft being shown as partly broken away, Fig. 6 is a side elevation of the valve which operates within the inner member of the clutch, showing the construction of the same and its novel form of stem for rotating the valve, Fig. 7 is an end view of the shaft and the slidable clutch sleeve thereon, on line 7—7 of Fig. 3, showing the manner of mounting the block therein for operating the stem of the valve shown in Fig. 6, the shaft and the valve stem being shown in section.

I desire to here state that while I have illustrated the structures shown in Figs. 3, 5, 6 and 7 in one position for the sake of clearness and convenience, it is to be understood that these structures are to be reversed from their present positions when the same are used in connection with the structures shown in Figs. 1 and 2.

Referring to Fig. 1 of the drawings, 1 denotes the cylinders of a four cylinder type of an automobile engine having operating therein the pistons 2, connected by the pitman rods 3 to the cranks 4 of the engine shaft 5, upon the outer end of which is the cranking lever 6, and inclosing the engine shaft and its connected parts, the fly wheel, the clutch mechanism, and a portion of the transmission gearing shaft 7, is the lubricating oil casing 8, and positioned within the rear end of the oil casing 8 upon the transmission shaft 7 is the spring actuated shaft brake 9. In the upper portion of the oil casing 8 adjacent the rear end thereof is the elongated slot 10 through which passes the clutch operating lever 11.

In applying my invention to an automobile engine, I construct and assemble together the parts shown in Figs. 1, 2, 5, 6, and 7, by forming the fly wheel of the engine in a manner wherein the same efficiently provides one of the members of the clutch. This is accomplished by forming the fly wheel with a disk 12 concentrically mounted upon the engine shaft 5, and provided with the hub 13 by which the disk 12 may be secured to the engine shaft 5 through any suitable means, or the disk 12, the hub 13, and the shaft 5 may be formed in an integral structure as shown in Fig. 3 if desired, and secured upon the disk 12, or formed integrally therewith at one side thereof, is the substantially cylindrical casing 14 constituting the cylindrical member or outer-body member of a power translating device. The casing 14 projects laterally from the face of the disk 12 and is mounted eccentrically to the axis of the disk 12, and suitably secured to the opposite end of the casing 14 is the disk 15 similar to the disk 12, the disk 15 being positioned concentric with the disk 12, the engine shaft 5 and the transmission gearing shaft 7, which is in alinement with the engine shaft 5, the casing 14 being also eccentrically disposed to the disk 15. The disk 15 is provided with the hub 16 through which loosely passes the transmission gearing shaft 7, the hub 16 of the disk 15 being provided in its outer end with the recesses 17 for receiving the locking lugs 18 of the clutch sleeve 19 slidably mounted upon the transmission shaft 7 and actuated by the forked end 20 of the operating lever 11, suitably seated in the annular groove 21 of the clutch sleeve, as clearly shown in Figs. 1 and 3 of the drawings.

For counterbalancing the fly wheel construction, shown in Figs. 1 and 2 and at the same time to automatically supply fluid to the interior of the fly wheel casing 14 from the engine casing 8, the outer wall of the fly wheel casing 14 is provided with the counterweight 22. This counterweight extends around the outer wall of the casing 14 for substantially three-fourths of the distance therearound, being enlarged at one end, but gradually diminishing in thickness in the direction of its opposite end, and formed within the counterweight 22 for its entire length and arranged parallel with the inner wall of the casing 14 is the fluid channel or conduit 23. This fluid conduit 23 extends the entire distance of the longitudinal length of the casing 14, and has its outer end open to provide the fluid inlet port 24, and its inner end turned radially inward as at 25 and communicates with the interior of the casing 14 through its fluid inlet port 26. Formed in the inner face of the disk 12 and concentric to the axis of the disk 12 and the engine shaft 5 is the circular groove 27, that portion of the disk 12 surrounded by the groove 27 is cut away for substantially half the depth of the groove 27 and provides the boss 28, which boss is also concentric with the engine shaft 5, and formed in the inner face of the disk 15 is the circular recess 29, the recess 29 being also disposed concentrically to the axis of the disk 15, the transmission shaft 7, and the engine shaft 5.

Mounted within the casing 14 and between the disks 12 and 15 thereof and upon the end of the transmission shaft 7, as seen by reference to Figs. 2, 3, 4 and 5 of the drawings, is the cage-like structure or innerbody member, which consists of the circular end plate or disk 30 provided with the laterally extending bars 31, provided with the spaces or large ports 32 therebetween of less width than the width of the respective bars 31, the end plate 30 having formed therein, and within the inner surfaces of the bars 31, the circular recess 33 for substantially half of the depth of the plate 30 and disposed concentrically with the axis of the plate 30 and the transmission shaft 7, the plate 30 being seated within the recess 29 of the disk 15, and arranged upon the opposite ends of the bars 31 is the ring-like member 34 which is adapted to be seated in the groove 27 of the disk 12 and surrounds the boss 28 of the disk 12, the diameters of the opening 35 in the ring 34, the boss 28, and the recess 33 of the plate 30 being the same. The bars 31 intersect the end blade or disk 30 and the ring 34 at points remote from the peripheries of the disk and ring, and have their inner faces concaved transversely thereof, while their outer faces are formed with the transversely concaved and longitudinally extending grooves 38.

Pivotally mounted in the opposing faces of the end plate 30 and the ring member 34 adjacent the respective peripheries thereof, as indicated at 36 in Figs. 2 and 4 of the drawings, are a plurality of wings or blades 37. These wings or blades 37 are preferably of a substantially concavo-convex formation in cross section, and are pivotally mounted substantially centrally of their longitudinal medial lines, and have their inner edges slightly rounded for adapting the same for traveling in a transverse direction within the concaved grooves 38 formed in the outer faces of the bars 31 and extending longitudinally thereof. The outer edges of the wings or blades 37 are provided with the substantially rounded ribs 39 for seating in the correspondingly formed grooves 40 formed longitudinally within the inner faces of the shoes or wear plates 41, which plates are provided with the broad slightly transversely curved faces 42.

Each wing or blade structure, pivoted substantially centrally of its effective width, receives approximately-equal pressures on opposite sides of its pivotal axis when the fluid in a compartment on either side of the blade is put under pressure, and any unbalanced pressure on either edge of a wear shoe portion tends (though but slightly, on account of the relatively small effective area of such shoe-portion) to tilt such pressure-receiving edge into intimate contact with the casing. Thus, in operation the shoes of the blade structures make constant contact with the casing, but do not grind thereon unduly and thus the life of casing and shoes is prolonged by the equalizing arrangement of the blades. Furthermore the shoes may take up a very considerable amount of wear without renewal, and their renewal is not expensive or difficult. Furthermore, the convexo-concave, or generally-angular arrangement of each blade, disposing its inner portion to swing across a radial position in its movements and its outer portion at a considerable angle to the first mentioned portion, enables the shoe-bearing outer edge of the blade to follow eccentricity of the casing with only a relatively small angular displacement of the blade about its pivotal axis, so that wear on its inner edge, traveling in the arcuate groove 38 of a bar 31, is minimized, and so that such bar 31 may be made quite narrow, allowing ample space for port-formation between the several bars 31.

For controlling the fluid which substantially fills the casing 14 and the cage therein as shown in Fig. 4, the rotary valve shown in Fig. 6 of the drawings is provided. This valve consists of oppositely disposed solid end disks 44 and 45 which are connected together at their peripheries by a plurality of laterally extending bars 46 provided with transversely convexed outer faces, for snugly engaging the inner concaved faces of the bars 31, and having the spaces or radial ports 47 therebetween, the length of the rotary valve being equal to the distance from the bottom of the recess 33 of the plate 30 to the inner face of the boss 28 of the disk 12, and the diameter of the disks being equal to the diameter of the recess 33, the opening 35 in the ring 34, and the distance between the inner faces of the bars 31 of the cage structure, whereby the disk 44 of the valve is snugly seated within the recess 33 of the end plate 30, the disk 45 of the valve fitting snugly within the opening 35 in the ring 34, the outer face of the disk 45 snugly engaging the face of the boss 28 of the disk 12, and the outer convex faces of the bars 46 snugly engaging the inner concave faces of the bars 31 of the cage structure.

The width of the bars 46 of the valve is greater than the width of the spaces 47 therebetween, and when the valve is in operative position within the casing, the meeting faces of the respective bars 38 and 46 are of the same width, therefore, the spaces 32 and 47 are in complete registry with each other when the valve is in open position as shown in full lines in Figs. 2 and 4, but as the width of the bars 46 of the valve is greater than the width of the spaces 32 of the cage, the bars 46 of the valve will efficiently close the spaces 32 between the bars 31 of the cage when the valve is rotated as shown in dotted lines in Fig. 2.

Formed centrally upon the outer face of the disk 44 of the valve is a hub 48, and extending therefrom is the operating valve stem 49, the stem 49 is preferably square in cross section and is slightly wrung or twisted in one direction adjacent its outer end as at 50, whereby the faces of the end 51 of the valve stem 49 being slightly out of the plane of the faces of the remaining portion of the valve stem. When the valve is positioned within the casing the hub 48 is snugly seated in the end of the central bore or channel 52 of the transmission shaft 7, as shown in Figs. 3 and 8, the stem 49 of the valve extends for a distance within the bore 52 with its end 51 slidably seated in the square aperture 53 formed centrally through the valve operating bar 54 which extends diametrically across the clutch sleeve 19, and is seated within the oppositely disposed recesses 55 formed in the outer face of the clutch sleeve 19 and secured within the recesses 55 through the medium of the bolts 56. The bar 54 extends through the elongated transversely disposed slots 57 formed in the transmission shaft 7 at a point slightly remote from the clutch mechanism, the valve actuating bar 54 being capable of longitudinal, slidable movement within the slots 57, and at the same time performs the function of a keyed connection between the transmission shaft 7 and the clutch sleeve 19, whereby the shaft 7 and the sleeve 19 rotate in unison.

While the greater part of the structure shown in Figs. 3 and 4 is identical with the structure of Figs. 1 and 2, and has been referred to in describing the parts and the application of my invention to the fly wheel of the engine, the structure shown in Figs. 3 and 4 is also drawn to illustrate the application of the invention to a two part shaft, and in this instance all of the working parts are the same, excepting, instead of forming the fly wheel in such manner as to use the same as part of the clutch mechanism as illustrated by the casing 14 in Figs. 1 and 2, a fly wheel of a power driven pulley may be positioned at any point upon the shaft 5, and in lieu of the casing 14 of Fig. 2, the eccentrically mounted casing 14 of Fig. 4 is employed. This casing 14 of Fig. 4 is counter-balanced differently from the casing 14 of Fig. 2, in that, it is not provided with the fluid channel or conduit 23 shown in Fig. 2, but in lieu thereof is provided the counterweights 58 and with the filling hole 59 through which the fluid is poured for filling the clutch mechanism with the fluid, as shown at 43 in Fig. 4 of the drawings, the hole or aperture 59 being internally screw-threaded for a portion of its length for receiving the screw-threaded plug 60 for retaining the fluid within the clutch. To guard against any escape of the fluid in this instance, as well as when applied as illustrated in Figs. 1 and 2, the hub 16 of the disk 15 is provided with the packing gland 61.

The operation of this invention and the manner of applying it to an automobile engine will be more clearly understood by referring to Figs. 1, 2, 5, 6 and 7, and certain parts of Figs. 3 and 4, wherein upon the cranking and initial starting of the engine, the fly wheel and its casing 14 will revolve in the direction of the arrow shown in Figs. 1 and 2, the clutch sleeve 19, being in the position shown in Figs. 1 and 3, retains the rotary valve in the position shown in full lines in Figs. 2 and 4, whereby the fluid within the casing 14 is free to pass from one side of the casing through the cage and the valve to the respective opposite sides of the casing as indicated by the arrows in Fig. 4. It will thus be seen that the fly wheel and its casing 14 are free to revolve with the engine shaft 5 independently of the cage and valve and the transmission shaft 7 upon which the same are attached, and the fluid is free to pass from the gradually diminishing areas between the casing and the cage structure through the cage to the gradually increasing areas at the respective diametrically opposite sides, as clearly indicated by the arrows in Fig. 4. The casing 14 is presumed to be filled with the fluid, however, should the quantity of the fluid from any cause have become diminished, the deficiency is readily supplied by the force of impact created at the inlet port 24 by the fly wheel casing 14 rapidly revolving in the fluid contained in the engine casing 8 and the suction created in the gradually increasing area adjacent the outlet port 26, thus forcing the fluid through the inlet port 24 and the fluid conduit 23, and discharging the fluid in the interior of the casing 14 through the outlet port 26 of the fluid conduit 23, and in this manner a sufficient quantity of fluid is maintained within the casing. After the engine has been started, and it is desired to connect the same with the transmission shaft 7, the clutch operating lever 11 is actuated in such manner as to force the clutch sleeve 19 inwardly toward the fly wheel, this movement of the sleeve 19 carries with it the valve stem actuating bar 54 which slides along the end of the valve stem until the same reaches the wrung or twisted portion 50 of the stem, and by the further continuing movement of the clutch sleeve 19 and the bar 54, the flat walls of the square aperture 53 engaging the curved faces of the portion 50, rotates the valve stem 49 and the rotary valve approximately forty-five degrees or one-eighth of a circle, which movement of the rotary valve moves the bars 46 thereon from their position shown in full lines in Figs. 2 and 4 to the position shown in dotted lines in Fig. 2, thereby closing the spaces 32 between the bars 31 of the cage, and prevents the fluid within the casing from passing from one side to the other thereof. In this relative position of the parts, the fluid is confined within the area between the inner wall of the casing 14, the adjacent bars 31 of the cage, the outer face of one of the bars 46 of the rotary valve, and between two adjacent wings or blades 37, whereby upon the further movement of the casing 14 the fluid contained within this area will be compressed by the gradual diminishing of the area due to the eccentric mounting of the casing 14, causing an impinging or clutching action between the fluid and the respective surfaces in contact therewith, and this clutching action causes the cage and the valve to gradually rotate in the direction of the arrow shown in Fig. 2, together with the transmission gearing shaft 7, and until the cage, the valve, and the shaft 7 rotate nearly in unison with the fly wheel and the casing 14, whereupon the clutch sleeve 19 is forced inwardly until the locking lugs 17 of the disk 15 are seated within the recesses 18 of the clutch sleeve 19 and subsequently rigidly locking together the engine shaft 5 and the transmission shaft 7, which relieves the necessity of further relying upon the fluid for the connection. It will further be seen that as the clutch sleeve 19, together with the valve stem operating bar 54 is moved inwardly, that the valve is rotated slowly for gradually closing the spaces between the bars 31 of the cage for gradually cutting off the fluid in its cross passage through the cage, resulting in the gradual confinement and compression of the fluid as the respective areas are diminished, forming a gradual clutching action between the members of the clutch for gradually increasing the speed of the transmission gearing shaft 7, as well as to prevent excessive torque upon the shaft.

The only difference between the construction shown in Figs. 3 and 4 and that of Figs. 1 and 2 is the difference in the construction of the casing 14, the casing 14 in Figs. 3 and 4 being designed to adapt the clutch mechanism for connecting an automobile engine shaft or other power driven shaft which is not submerged in the oil casing, therefore, the fluid channel or conduit 23 shown in Fig. 2 is eliminated, and further, in this construction, the cage and its valve may be mounted upon the end of the engine or power driven shaft and the casing upon the transmission shaft, if desired, and which will operate in this reversal of the parts with an equal degree of efficiency.

Having now described my invention, what I claim as new, and desire to secure by Letters-Patent, is:—

1. In a fluid clutch, the combination with an engine or other casing containing fluid, a drive shaft, and a driven shaft operating in said casing, of an outer clutch member eccentrically mounted upon said drive shaft and providing a fluid chamber, an inner clutch member concentrically mounted upon said driven shaft and operating within the fluid in said outer clutch member, means carried by said inner clutch member to be engaged by the fluid within said outer clutch member, means within said inner clutch member for controlling the fluid within the clutch, said outer clutch member and said inner clutch member having oppositely disposed increasing and diminishing areas therebetween upon the revolution of said outer clutch member around said inner clutch member, and means carried by said outer clutch member for automatically supplying fluid to the interior thereof from said casing by the force of impact caused by the revolution of said outer clutch member assisted by the suction created in certain of the increasing areas within said clutch.

2. In a fluid clutch, the combination with an engine or other casing containing a fluid, a drive shaft, and a driven shaft operating in said casing, of an outer clutch member eccentrically mounted upon said drive shaft and providing a fluid chamber, an inner clutch member concentrically mounted upon said driven shaft and operating within said outer clutch member, means carried by said inner clutch member to be engaged by the fluid within said clutch members, means within said inner clutch member for controlling the fluid within said members, means for actuating said fluid controlling means, a counter-weight formed upon said outer clutch member, and a fluid conduit in said counter-weight, whereby the fluid in said fluid casing is automatically supplied to the interior of said outer clutch member upon the revolution of the latter.

3. In a fluid clutch, the combination with a drive shaft, and a driven shaft provided with a central bore and a transverse slot therethrough, of an outer clutch member eccentrically mounted upon said drive shaft and providing a fluid chamber, an inner clutch member concentrically mounted upon said driven shaft and operating within said outer clutch member, a rotatively mounted valve operating within said inner clutch member for controlling the fluid within said members, a valve stem for actuating said valve projecting into the central bore of said drive shaft, said valve stem being rectangular in cross section and having a spiral formation adjacent its outer end, a clutch sleeve slidably mounted upon said driven shaft, an actuating bar carried by said clutch sleeve projecting through the transverse slot of said driven shaft and longitudinally slidable therein, said bar having a rectangular aperture for slidably receiving said valve stem, opposing clutch faces upon said clutch sleeve and said outer clutch member, and means for actuating said clutch sleeve, whereby upon the inward movement of said clutch sleeve, said actuating bar engages the spiral formation of said valve stem for rotating said stem and said valve for causing gradual clutching action between said inner and said outer clutch members, and subsequently rigidly locking said clutch members together upon the continued movement of said clutch sleeve.

4. In a clutch, the combination with a drive shaft, and a driven shaft, of an outer clutch member eccentrically mounted upon said drive shaft and providing a fluid chamber, an inner clutch member concentrically mounted upon said driven shaft and operating within said eccentrically mounted outer clutch member, said inner clutch member consisting of a hollow cylindrical cage comprising an end disk and an end ring member, and spaced bars connecting said disk and said ring member, blades pivotally mounted upon said cage for operating between the bars of said cage and said outer clutch member, a hollow cylindrical valve rotatably mounted within said cage and comprising end disks, and spaced bars connecting said disks and adapted to register with the bars of said cage, a valve stem for said valve having means adjacent its outer end to provide for the rotation of said valve stem and valve, and a clutch sleeve slidably mounted upon said driven shaft and carrying an actuating bar for operating said valve stem, whereby upon the inward movement of said sleeve and said bar said valve is rotated for closing the spaces between the bars of said cage by the bars of said valve to prevent the passage of the fluid through the cage and valve for causing clutching action between said clutch members.

5. In a clutch, the combination with a drive shaft, and a driven shaft, of an outer clutch member eccentrically mounted upon said drive shaft and providing a fluid chamber, an inner clutch member concentrically mounted upon said driven shaft and operating within said eccentrically mounted outer clutch member, said inner clutch member consisting of a hollow cylindrical cage having an end disk and an end ring member, spaced bars connecting said disk and said ring member at points remote from the peripheries thereof, said bars having concaved inner faces, and concaved grooves formed in their outer faces, a hollow cylindrical valve rotatably mounted within said cage and having end disks, spaced bars connecting said disks at their peripheries and provided with convexed outer faces adapted to register with and snugly engage the inner concaved faces of the bars of said cage, the meeting faces of said bars being of equal width but of greater width than the spaces between the respective bars, whereby upon the rotation of said valve the bars thereof efficiently close the spaces between the bars of said cage to prevent the passage of the fluid therethrough, a stem for said valve, means for rotating said valve, a plurality of concavo-convex blades pivotally mounted along their longitudinal medial lines upon said disk and said ring member of said cage and adjacent the peripheries thereof, the inner edges of said blades being rounded and operating within the concave grooves of the bars of said cage, ribs upon the outer ends of said blades, and shoes swingingly mounted upon the ribs of said blades.

6. In a power-translating device, the combination of inner and outer bodies one rotatable with respect to the other providing between them an eccentric interspace; blade structures carried by one said body dividing the eccentric interspace between the bodies into compartments, each said blade-structure pivoted to the carrying body adjacent the center of blade-width, for substantial equalization of pressures on opposite sides of the pivotal axis, and means for controlling fluid flow relative to said compartments.

7. In a power-translating device, the combination of inner and outer bodies one rotatable with respect to the other providing between them an eccentric interspace; blade structures carried by one said body dividing the eccentric interspace between the bodies into compartments, each said blade-structure pivoted to the carrying body adjacent the center of blade-width, for substantial equalization of pressures on opposite sides of the pivotal axis, and having a shoe pivoted to its outer edge and means for controlling fluid flow relative to said compartments.

8. In a power-translating device the combination of an outer casing member, an inner body member, said members providing between them an eccentric interspace and one rotatable relative to the other, the inner member presenting a plurality of concaved surfaces and carrying a plurality of blades, each pivoted near the center of its width, with its inner edge sweeping in one of said concaved surfaces, the outer portions of the blade structures coöperating with the outer casing thereby to divide the eccentric interspace between the members into a plurality of compartments and means for controlling fluid flow relative to said compartments.

9. In a power translating device, two bodies, one rotatable relative to the other and one eccentric to and the other concentric with the axis of rotation, providing an interspace between them of eccentric form varying the position of its eccentricity when the bodies relatively move, blades pivoted to the concentric body dividing the interspace into compartments, each said blade being pivoted adjacent the center of its width for substantial equalization of the pressure exerted on opposite halves of the blade by fluid in either compartment, and means for controlling fluid flow relative to said compartments.

10. In a power-translating device, the combination of inner and outer bodies one rotatable with respect to the other providing between them an eccentric interspace; blade structures carried by one said body dividing the eccentric interspace between the bodies into compartments, each said blade-structure pivoted to the carrying body adjacent the center of blade-width, for substantial equalization of pressures on opposite sides of the pivotal axis, and each said blade being angular in cross section, and means for controlling fluid flow relative to said compartments.

11. In a power-translating device, the combination of inner and outer bodies one rotatable with respect to the other providing between them an eccentric interspace; blade structures carried by one said body dividing the eccentric interspace between the bodies into compartments, each said blade-structure pivoted to the carrying body adjacent the center of blade-width, for substantial equalization of pressures on opposite sides of the pivotal axis, and each said blade being angular in cross section, and carrying a wear shoe on its outer edge, and means for controlling said fluid flow relative to said compartments.

12. In a power-translating device, the combination of inner and outer bodies one rotatable with respect to the other providing between them an eccentric interspace; blade structures carried by one said body dividing the eccentric interspace between the bodies into compartments, each said blade-structure pivoted to the carrying body adjacent the center of blade-width, for substantial equalization of pressures on opposite sides of the pivotal axis, and each said blade being angular in cross section, and carrying, pivoted to its outer edge, an arcuate wear shoe for contact with the outer body.

13. In a power-translating device, the combination of a liquid-filled casing member, an inner body member, one rotatable with respect to the other, providing between them an eccentric interspace, means dividing said eccentric interspace into compartments, said body member having ports opening radially to said compartments, a valve rotatable within the body member having radial ports, and means for rotating said valve to open or close communication between the valve ports and body-member ports.

14. In a power-translating device, the combination of a rotatable liquid-filled casing member, an inner, rotatable body member having a central chamber extending substantially its full length and having a plurality of large radial ports opening from said chamber to the eccentric interspace provided between the two members, pivoted substantially-balanced blades carried by the inner member dividing the interspace into compartments into which respectively the ports open, a cylindrical valve having radial ports and mounted within said chamber of the inner member for rotation with and with respect to said inner member, and means for rotating said valve with respect to said inner member.

In testimony whereof I have signed my name to this specification in the presence of two subscribing witnesses.

ALLEN HERBERT SWEET.

Witnesses:
W. A. FERGUSON,
T. L. SUMERS.